United States Patent
Jain et al.

(10) Patent No.: US 12,267,817 B2
(45) Date of Patent: Apr. 1, 2025

(54) DYNAMIC SLOT AND ANCHOR ALLOCATION

(71) Applicant: Apple Inc., Cupertino, CA (US)

(72) Inventors: Swapnil S. Jain, Cupertino, CA (US); Chengzhou Li, Cupertino, CA (US); Arun Unkn, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 260 days.

(21) Appl. No.: 17/693,174

(22) Filed: Mar. 11, 2022

(65) Prior Publication Data
US 2022/0295483 A1  Sep. 15, 2022

Related U.S. Application Data

(60) Provisional application No. 63/160,554, filed on Mar. 12, 2021.

(51) Int. Cl.
 *H04W 72/0446* (2023.01)
 *H04B 1/7163* (2011.01)
 *H04W 4/029* (2018.01)

(52) U.S. Cl.
 CPC ...... *H04W 72/0446* (2013.01); *H04B 1/7163* (2013.01); *H04W 4/029* (2018.02)

(58) Field of Classification Search
None
See application file for complete search history.

(56) References Cited

U.S. PATENT DOCUMENTS

| | | | |
|---|---|---|---|
| 10,567,035 B1* | 2/2020 | Torborg | H04W 56/005 |
| 2015/0247916 A1* | 9/2015 | Bartov | G01S 5/02585 |
| | | | 455/456.6 |
| 2017/0243485 A1 | 8/2017 | Rubin et al. | |
| 2019/0302231 A1 | 10/2019 | Kuzbari et al. | |
| 2021/0027631 A1 | 1/2021 | Ye et al. | |
| 2021/0112548 A1* | 4/2021 | de Perthuis | G01S 13/765 |
| 2021/0245707 A1 | 8/2021 | Golsch et al. | |
| 2022/0070613 A1* | 3/2022 | Barton | H04W 72/56 |

FOREIGN PATENT DOCUMENTS

CN  107923963  4/2018

* cited by examiner

*Primary Examiner* — Anh Ngoc M Nguyen
(74) *Attorney, Agent, or Firm* — Fish & Richardson P.C.

(57) ABSTRACT

Techniques for dynamic slot and anchor allocation include accessing allocation data representing at least one time slot allocated for transmission of a radio frequency signal over a wireless communication channel to a wireless device, assigning the at least one time slot to an anchor of a location system, and causing transmission of the radio frequency signal from the anchor to the wireless device in the at least one time slot.

17 Claims, 14 Drawing Sheets

DYNAMIC SLOT AND ANCHOR ALLOCATION

CROSS-REFERENCE TO RELATED APPLICATIONS

This application claims priority to and the benefit of U.S. Provisional Patent Application No. 63/160,554, filed Mar. 12, 2021, the entire content of which is incorporated herein by reference

TECHNICAL FIELD

This disclosure relates generally to wireless communications.

BACKGROUND

Location systems, such as real-time location systems (RTLS), are used to identify and track the location of objects or people in real or near-real time. In some location systems, wireless tags or other wireless devices are attached to objects or carried by people, and fixed anchors or readers arranged at known locations communicate with the wireless tags or devices to determine their location. The physical layer of location systems is typically some form of radio frequency (RF) communication, but some systems use optical (e.g., infrared) or acoustic (e.g., ultrasound) technology instead of or in addition to RF.

SUMMARY

In general, in a first aspect, a method includes: accessing allocation data representing at least one time slot allocated for transmission of a radio frequency signal over a wireless communication channel to a wireless device; assigning the at least one time slot to an anchor of a location system; and causing transmission of the radio frequency signal from the anchor to the wireless device in the at least one time slot.

In general, in a second aspect combinable with the first aspect, the anchor is a first anchor, the method including receiving a location of the wireless device; and assigning the at least one time slot to a second anchor of the location system that is different from the first anchor based on the location of the wireless device.

In general, in a third aspect combinable with the second aspect, the second anchor is located closer to the location of the wireless device than the first anchor.

In general, in a fourth aspect combinable with any of the first through third aspects, the anchor is a first anchor, the method including: receiving data representing a trajectory of the wireless device; identifying a second anchor of the location system based on the trajectory of the wireless device; and assigning the at least one time slot to the second anchor.

In general, in a fifth aspect combinable with the fourth aspect, identifying the second anchor includes determining, based on the trajectory of the wireless device, that the wireless devices is approaching a range of the second anchor.

In general, in a sixth aspect combinable with any of the first through fifth aspects, the anchor is a first anchor, the method including receiving data indicating that the wireless device has entered a vehicle, and assigning the at least one time slot to a second anchor of the location system that is within the vehicle.

In general, in a seventh aspect combinable with any of the first through sixth aspects, the method includes receiving the allocation data from the wireless device.

In general, in an eighth aspect combinable with any of the first through seventh aspects, the radio frequency signal is an ultra-wideband (UWB) signal.

In general, in a ninth aspect, a device includes one or more processors and one or more computer-readable storage medium storing instructions which, when executed by the one or more processors, cause the one or more processors to perform the operations of any of the first through eighth aspects.

In general, in a tenth aspect, a non-transitory computer-readable medium stores instructions which, when executed by one or more processors, cause the one or more processors to perform the operations of any of the first through eighth aspects.

In general, in an eleventh aspect, a method includes: receiving, at a wireless device, data indicating an expected reception of a radio frequency signal over a first wireless communication channel from an anchor of a location system; identifying at least one time slot in which a second wireless communication channel is clear from transmissions by the wireless device; and generating allocation data representing the at least one time slot.

In general, in a twelfth aspect combinable with the eleventh aspect, the method includes transmitting the allocation data to the anchor of the location system, and receiving, at the wireless device, the radio frequency signal from the anchor in the at least one time slot.

In general, in a thirteenth aspect combinable with the twelfth aspect, the allocation data is transmitted to the anchor of the location system over a third wireless communication channel that is different than the first and second wireless communication channels.

In general, in a fourteenth aspect combinable with any of the eleventh through thirteenth aspects, the method includes transmitting a transmission blanking request to prevent transmission on the second wireless communication channel by the wireless device during the at least one time slot.

In general, in a fifteenth aspect combinable with any of the eleventh through fourteenth aspects, the method includes: accessing data representing a transmission pattern for transmissions by the wireless device on the second wireless communication channel; determining, based at least in part on the transmission pattern, whether the at least one time slot overlaps with a transmission on the second wireless communication channel; and identifying the at least one time slot in response to a determination that the at least one slot does not overlap with a transmission on the second wireless communication channel.

In general, in a sixteenth aspect combinable with the fifteenth aspect, the transmission pattern includes a Long-Term Evolution time-division duplex (LTE-TDD) configuration.

In general, in a seventeenth aspect combinable with any of the eleventh through sixteenth aspects, the expected reception of the radio frequency signal over the first wireless communication channel is triggered by a ranging operation between the wireless device and the anchor of the location system.

In general, in an eighteenth aspect combinable with any of the eleventh through seventeenth aspects, the radio frequency signal includes an UWB signal.

In general, in a nineteenth aspect combinable with any of the eleventh through eighteenth aspects, the at least one time slot is different from a time slot of the expected reception of the radio frequency signal.

In general, in a twentieth aspect combinable with any of the eleventh through nineteenth aspects, at least a portion of a transmission by the wireless device on the second wireless communication channel interferes with reception of the radio frequency signal over the first wireless communication channel.

In general, in a twenty-first aspect combinable with the twentieth aspect, the at least a portion of the transmission by the wireless device includes a harmonic of the transmission by the wireless device on the second wireless communication.

In general, in a twenty-second aspect combinable with any of the eleventh through twenty-first aspects, at least a portion of a frequency band of the first wireless communication channel overlaps with a frequency band of the second wireless communication channel.

In general, in a twenty-third aspect, a device includes one or more processors and one or more computer-readable storage medium storing instructions which, when executed by the one or more processors, cause the one or more processors to perform the operations of any of the eleventh through twenty-second aspects.

In general, in a twenty-fourth aspect, a non-transitory computer-readable medium stores instructions which, when executed by one or more processors, cause the one or more processors to perform the operations of any of the eleventh through twenty-second aspects.

The details of one or more implementations are set forth in the accompanying drawings and the description below. The techniques described here can be implemented by one or more wireless communication systems, components of a wireless communication system (e.g., a station, an access point, a user equipment, a base station, etc.), or other systems, devices, methods, or non-transitory computer-readable media, among others. Other features and advantages will be apparent from the description and drawings, and from the claims.

BRIEF DESCRIPTION OF DRAWINGS

Like reference symbols in the various drawings indicate like elements.

DETAILED DESCRIPTION

Figure 1:
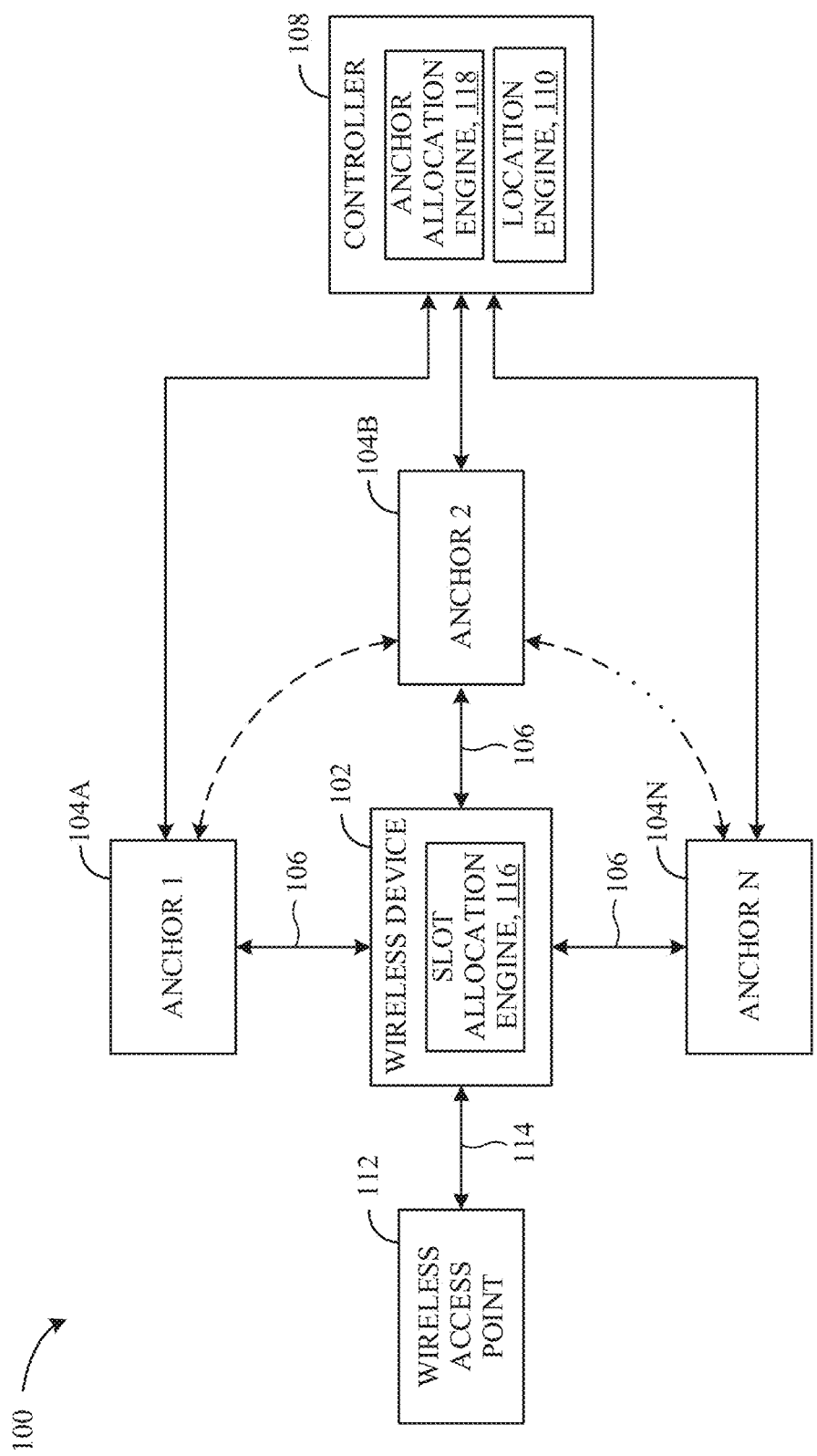
FIG. 1 illustrates an example location system.

FIG. 1 illustrates an example location system 100 in accordance with an aspect of the present disclosure. In this example, the system 100 is configured to identify and track the location of a wireless device 102, such as a smart phone, a tag device, or another portable electronic device (e.g., a tablet, a laptop, or a wearable device, such as a smart watch, among others). To do so, the system 100 includes a set of anchors 104a, 104b, ..., 104N arranged at known locations within an environment. Each of the anchors 104a, 104b, ..., 104N (referred to collectively as "anchors 104") communicate with one another and with the wireless device 102 over a wireless communication channel 106 to perform ranging operations. For example, the wireless communication channel 106 can be an ultra-wideband (UWB) channel, and the wireless device 102 and anchors 104 can perform ranging operations using UWB signals (e.g., a transmission from an antenna for which the emitted signal bandwidth exceeds the lesser of 500 MHz or 20% of the center frequency and complies with the Federal Communication Commission (FCC) Power Spectrum Density upper limit of −41.3 DBm per Mh). In this context, the term "ranging" refers to the measurement of the relative distance between the wireless device 102 and an anchor 104. Once measured, the distances between the wireless device 102 and each anchor 104 are provided to a controller 108. A location engine 110 of the controller 108 performs localization operations using the measured distances to determine the absolute or relative location of the wireless device 102.

At times, the wireless device 102 may communicate with a wireless access point 112 over a wireless communication channel 114. For example, the wireless access point 112 can be a cellular base station, and the wireless device 102 can communicate with the cellular base station over a cellular network 114 in accordance with one or more cellular communication protocols (e.g., third generation partnership project (3GPP) protocols, such as universal mobile telecommunications system (UMTS) and related 3G standards, long-term evolution (LTE) and related 4G standards, 5G new radio (NR) and related 5G standards, or institute of electrical and electronics engineers (IEEE) 802.16 protocols, such as WiMAX, among others). In some examples, the wireless access point 112 can be a wireless local area network (WLAN) access point (e.g., a router), and the wireless device 102 can communicate with the router over a WLAN network 114 in accordance with one or more WLAN communication protocols (e.g., IEEE 802.11/Wi-Fi). In some examples, the wireless communication channel 114 can be another non-UWB (e.g., narrowband) communication channel providing communication between the wireless device 102 and another type of wireless access point 112.

In some examples, the coexistence of wireless communications over the communication channel 106 and the communication channel 114 can lead to interference at the wireless device 102. For example, concurrent reception of UWB signals from an anchor 104 over the wireless communication channel 106 and transmission of cellular LTE signals over the wireless communication channel 114 can cause mutual or non-mutual interference, leading to transmission/reception errors and data loss. This interference can be caused by, for example, overlapping frequency bands of signals transmitted/received over the wireless communication channels 106, 114, harmonics of signals transmitted/received over the wireless communication channels 106, 114 (such as a $3^{rd}$ harmonic frequency of a cellular LTE signal transmitted over the wireless communication channel 114 interfering with reception of an UWB signal over the wireless communication channel 106), or combinations of them, among others.

To reduce interference, the wireless device 102 includes a slot allocation engine 116 configured to allocate time slots, for example, for reception of UWB signals over the communication channel 106. For example, the slot allocation engine 116 can issue a blanking request to prevent transmission over the wireless communication channel 114 during a particular time period, and can assign those time slots for reception of UWB signals over the channel 106. As another example, the slot allocation engine 116 can identify time slots that are free of collision (e.g., based on transmit/receive schedules and/or patterns), and can allocate those time slots for reception of UWB signals over the channel 106.

In some examples, information indicative of the slots reserved by the slot allocation engine 116 are transmitted to the anchors 104 and/or the controller 108 to allocate the slots to the appropriate anchors. For example, an anchor allocation engine 118 of the controller 108 can assign an allocated slot to one or more of the anchors 104 based on the location of the wireless device 102, such as the anchors 104 that are closest to the wireless device 102. As another example, the anchor allocation engine 118 can allocate slots to anchors 104 based on a predicted trajectory of the wireless device 102. In this manner, the range of coverage of the system 100 and the connectivity between the anchors 104 and the device 102 are improved relative to systems without dynamic slot or anchor allocation.

Figure 2:
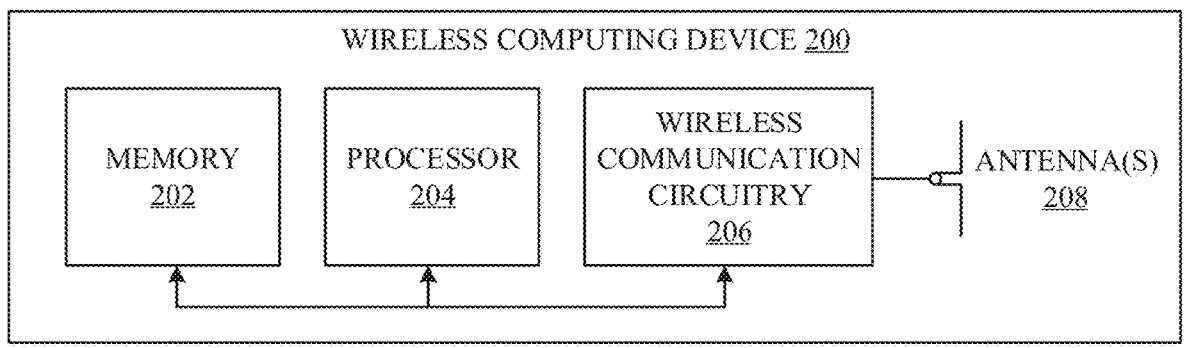
FIG. 2 illustrates an example wireless computing device.

In general, each of the wireless device 102, anchors 104, controller 108, and wireless access point 114 can be a computing device, such as the wireless computing device 200 shown in FIG. 2. Note that the system 100 can be configured to determine the location of more than one wireless device 102 and can include additional or fewer anchors 104 without departing from the scope of the present disclosure. In addition, although some components are described as being part of a particular component of the system 100, such components can be made part of a different component in some implementations. For example, the location engine 110 can be included in the wireless device 102 instead of or in addition to the controller 108 in some implementations.

Referring to FIG. 2, an example wireless computing device 200 configured for use in conjunction with various aspects of the present disclosure is shown. In this example, the device 200 includes a memory 202, a processor 204, wireless communication circuitry 206, and one or more antennas 208. The processor 204 is configured to execute instructions and manipulate data to perform operations of the device 200, including operations using algorithms, methods, functions, processes, flows, and procedures as described herein. The processor 204 can be, for example, a central processing unit (CPU), a reduced instruction set computing (RISC) processor, a complex instruction set computing (CISC) processor, a graphics processing unit (GPU), a digital signal processor (DSP) such as a baseband processor, a field-programmable gate array (FPGA), an application-specific integrated circuit (ASIC), a radio-frequency integrated circuit (RFIC), or combinations of them, among other processors. Although illustrated as a single processor 204 in FIG. 2, two or more processors 204 can be used in some implementations.

The processing element 204 can include or be coupled to one or more local and/or system memory elements, such as the memory 202. The memory 202 can include any of a variety of permanent/non-permanent and volatile/non-volatile memory and media devices, and can store instructions and/or data as described herein. For example, memory 202 could be RAM serving as a system memory for processing element 204. Other types of memory and functions are also possible. Although illustrated as a single memory 202 in FIG. 2, two or more memories 202 (of the same or different types) can be used in some implementations of the device 200.

The device 200 also includes wireless communication circuitry 206 coupled to one or more antennas 208. In an example, the wireless communication circuitry 206 (sometimes referred to here as a "radio") includes analog and/or digital circuitry components. In general, a radio can include any combination of a baseband processor, analog RF signal processing circuitry (e.g., filters, mixers, oscillators, amplifiers, etc.), and digital processing circuitry (e.g., for digital modulation as well as other digital processing). Similarly, the radio can implement one or more receive and transmit chains using the aforementioned hardware. For example, the wireless device 200 can share one or more parts of a receive chain and/or a transmit chain between one or more wireless communication technologies, such as those discussed above. In an example, the radio is configured to: receive baseband uplink signal(s) from, e.g., the baseband processor, convert the baseband uplink signal(s) to RF uplink signal(s), and transmit the RF uplink signal(s) onto a wireless medium using the one or more antennas 208. The radio is further configured to: receive RF downlink signal(s) from the wireless medium using the one or more antennas 208, convert the RF downlink signal(s) to baseband downlink signal(s), and provide the baseband downlink signal(s) to, e.g., the baseband processor.

Note that the wireless communication circuitry 206 can include a discrete processor or processing element in addition to the processor 204. For example, the processor 204 can be an 'application processor,' while wireless communication circuitry 206 can include its own 'baseband processor.' Alternatively (or in addition), the processor 204 can provide processing capability for the wireless communication circuitry 206. The device 200 can communicate using any of various wireless communication technologies by way of wireless communication circuitry 206 and the antenna(s) 208.

The device 200 can also include any of a variety of other components (not shown) for implementing device functionality, depending on the intended functionality of the device 200, which can include further processing and/or memory elements, one or more power supply elements (which may rely on battery power and/or an external power source), user interface elements (e.g., display, speaker, microphone, camera, keyboard, mouse, touchscreen, etc.), additional communication elements (e.g., antenna(s) for wireless communication, I/O ports for wired communication, communication circuitry/controllers, etc.) and/or any of various other components.

The components of the device 200, such as the memory 202, processor 204, wireless communication circuitry 206, and antenna(s) 208, can be operatively coupled using one or more intra-chip or inter-chip interconnection interfaces. As an example, a USB high-speed inter-chip (HSIC) interface can be provided for inter-chip communications between the processor 204 and the wireless communication circuitry 206. Alternatively (or in addition), a universal asynchronous receiver transmitter (UART) interface, a serial peripheral interface (SPI), inter-integrated circuit (I2C), system management bus (SMBus), and/or any of a variety of other communication interfaces can be used for communications between the memory 202, processor 204, wireless communication circuitry 206, and/or any of various other device components. Other types of interfaces (e.g., peripheral interfaces for communication with peripheral components within or external to device 200, etc.) can also be provided as part of device 200.

Figure 3A:
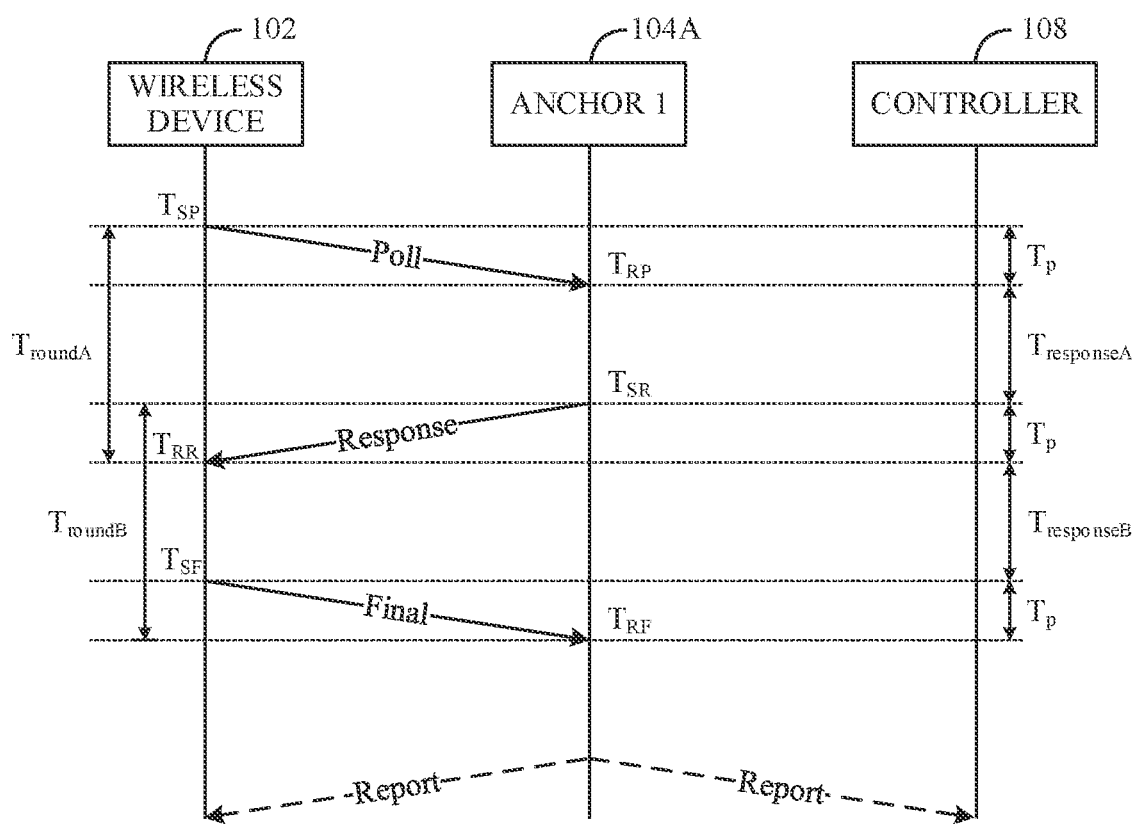
FIG. 3A illustrates an example of ranging.

FIG. 3A illustrates an example of a two-way ranging operation 300 in accordance with an aspect of the present disclosure. In this example, the wireless device 102 transmits a poll message to one or more anchors 104 at a time $T_{SP}$. The anchor 104 receives the poll message at time $T_{RP}$ after a propagation delay $T_P$. The anchor 104 transmits a response to the poll at time $T_{SR}$ after a processing delay $T_{responseA}$, The wireless device 102 receives the response message at time $T_{RR}$ after another propagation delay $T_P$, completing the first round of ranging ($T_{roundA}$). At this point, the distance between the wireless device 102 and the anchor 104 can be calculated as the propagation delay $T_{prop}=\frac{1}{2}(T_{roundA}-T_{responseA})$ multiplied by the wave propagation speed (e.g., c, the speed of light).

To reduce the potential for error, a second round of ranging can be performed and the average propagation delay for the two rounds can be used. To do so, the wireless device 102 transmits a final message to the anchor 104 at time $T_{SF}$ after a processing delay $T_{responseB}$. The anchor 104 receives the final message at time TRF after another propagation delay period $T_P$. In some examples, the final message from the wireless device 102 includes the previous timestamps (e.g., $T_{SP}$, $T_{RR}$, $T_{SF}$) to allow for subsequent calculation of the average propagation delay and distance. The anchor 104 (or another component of the system 100) can calculate the distance between the wireless device 102 and the anchor 104 as the average propagation delay $T_{prop}=\frac{1}{4}((T_{RR}-T_{SP})-(T_{SR}-T_{RP})+(T_{RF}-T_{SR})-(T_{SF}-T_{RR}))$ multiplied by the wave propagation speed. The anchor 104 can report determined range (or the propagation delay or timestamps) to the wireless device 102 or the controller 108, or both.

Although FIG. 3A illustrates one example of a ranging operation, the system 100 can implement other ranging techniques without departing from the scope of the present disclosure. For example, the system 100 can use another time of flight (ToF) ranging operation or a time delay on arrival (TDoA) ranging operation in addition to or instead of the ranging operation 300. In addition, the system 100 can be configured to calculate an angle of arrival (AoA) in cases where the wireless device 102 and/or anchor 104 are equipped with antennas able to resolve differences in phase or arrival time. The system 100 can also augment the radio frequency ranging techniques described here with other ranging techniques, such as received signal strength indication (RSSI) techniques, inertial ranging techniques, optical ranging techniques, or combinations of them, among others.

Figure 3B:
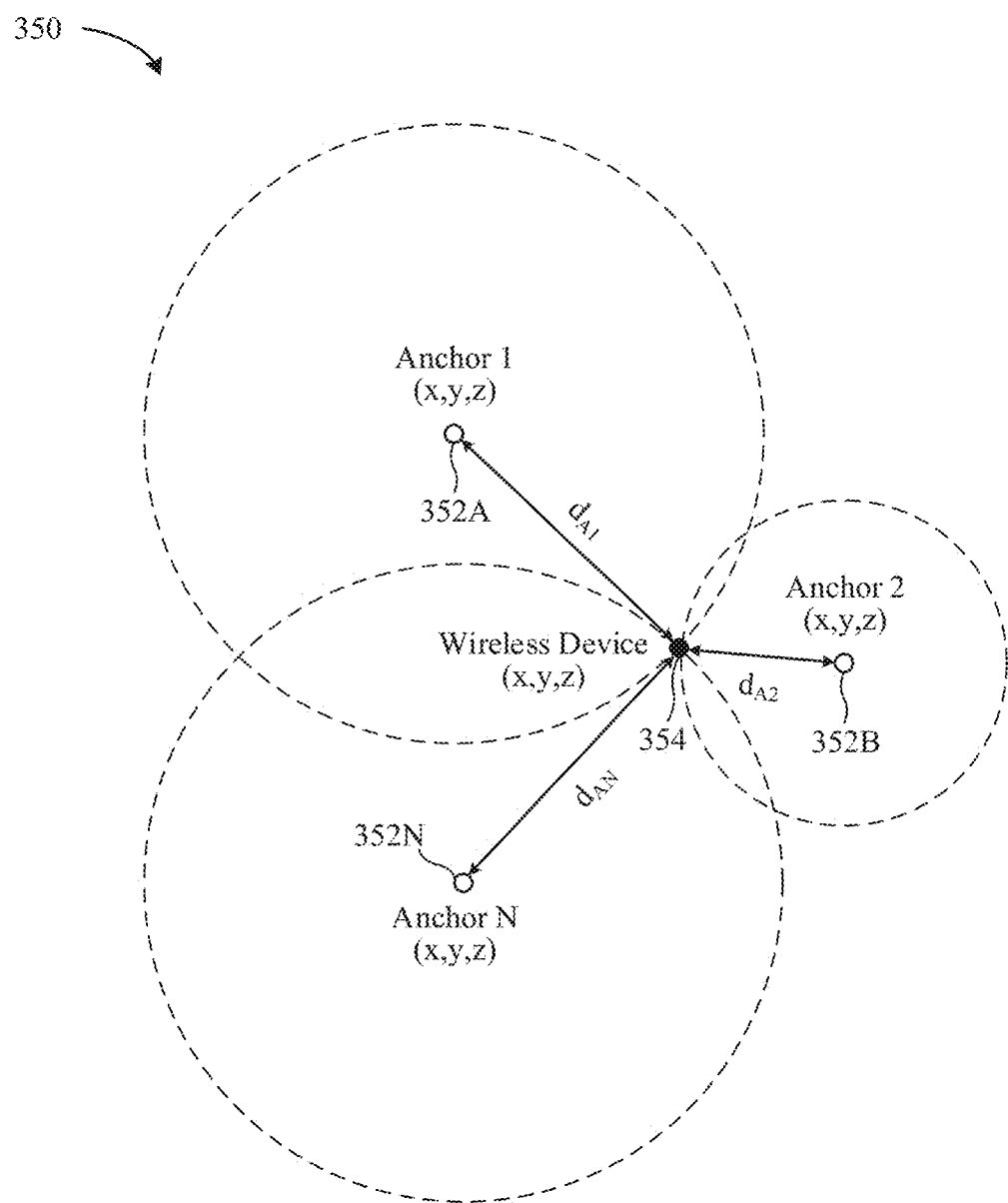
FIG. 3B illustrates an example of localization.

Referring to FIG. 3B, an example localization operation 350 is shown. In this example, distances $d_{A1}$, $d_{A2}$, and $d_{AN}$ between the wireless device 102 and each of the anchors 104 are calculated (e.g., using the ranging operation 300). A sphere with a radius corresponding to the measured distance is drawn from the three-dimensional (3D) location 352a, 352b, 352n of each anchor 104. The location 354 of the wireless device 102 is determined from the intersection of the spheres. In some examples, algorithms such as Fang, Bancroft, and/or Pythagoras's theorem are used to identify the intersection(s) among the spheres and discard false results.

Figure 4A:
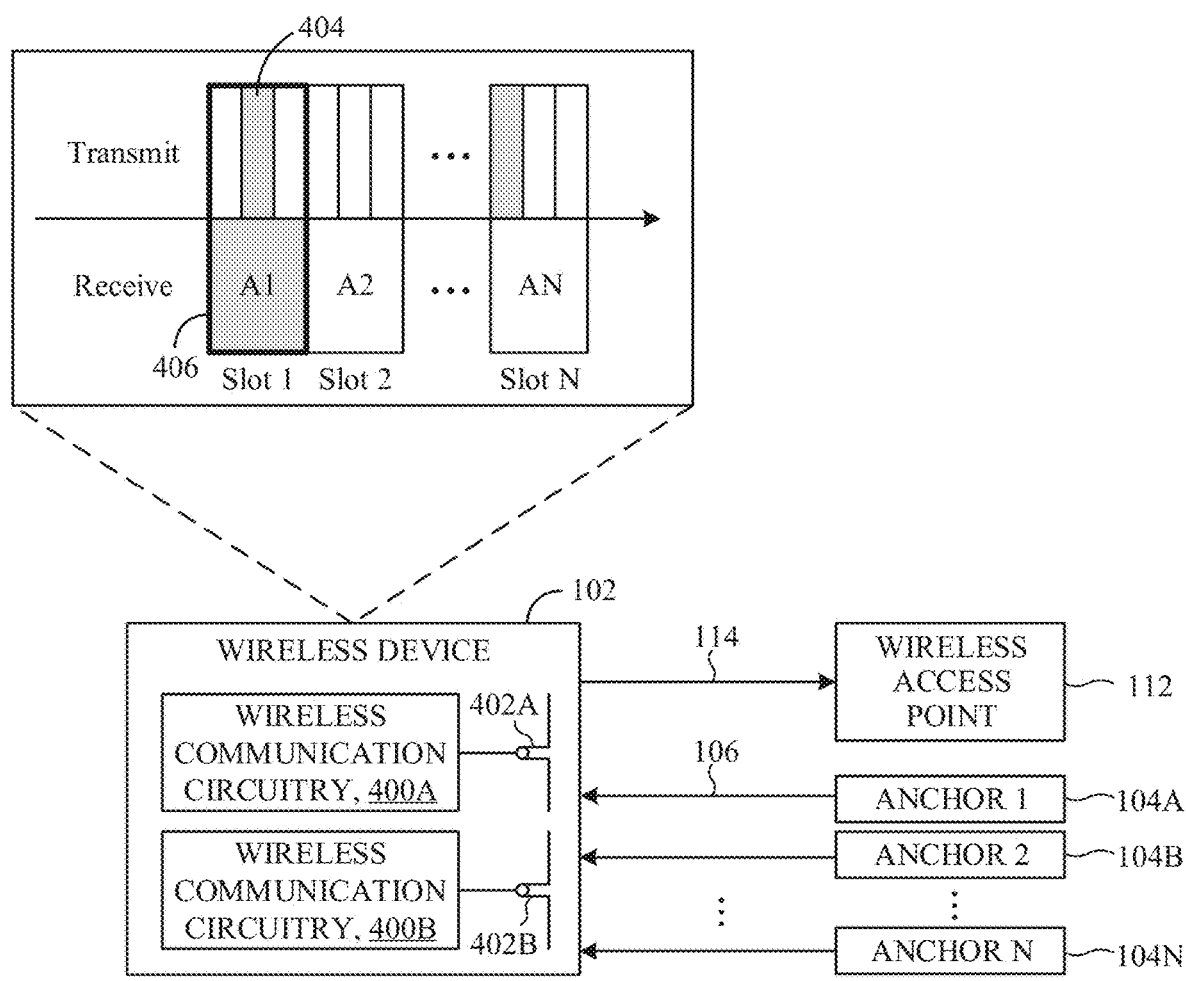
FIG. 4A illustrates an example of a wireless device with coexisting wireless communication systems.

Referring to FIG. 4A, an example of a wireless device 102 with coexisting wireless communication systems is shown. In general, when multiple wireless systems coexist in a small form factor (such as when the wireless device 102 is a smart phone or another portable electronic device), the wireless communication circuitry 400a, 400b and/or antennas 402a, 402b of each system are prone to interference. This is particularly apparent when the systems have interfering harmonics or overlapping or partially overlapping frequency bands, such as when LTE and UWB systems coexist. In addition, slot allocation for the anchors 104 is currently done in a fixed manner (e.g., the slot used by an anchor is fixed not only per session but for the entire software lifecycle). Since communications and resource constraints are dynamic in nature, transmission and reception performance within each slot varies over time leading to unpredictable data corruption and data loss (e.g., unpredictable ranging results).

As shown in FIG. 4A, the wireless communication circuitry 400a and corresponding antenna(s) 402a transmit data (e.g., radio frequency signals) to the wireless access point 112 over the wireless communication channel 114. In this example, the wireless access point 112 is a cellular base station, and the transmissions are in the form of LTE-TDD subframes 404 with LTE-TDD configuration 2 (e.g., one transmission subframe every 5 ms, as shown by the shaded subframe). On the other hand, the wireless communication circuitry 400b and corresponding antenna(s) 402b receive data (e.g., radio frequency signals) from the anchors 104 over the wireless communication channel 106. In this example, data in the form of UWB signals are received from the anchor 104 assigned to slot 1 (e.g., as shown by the shaded slot 1). Since the UWB data in slot 1 is received concurrently with transmission of LTE data in shaded subframe 404, the reception of the UWB data is corrupted by the LTE transmission (and vice versa) as shown by bolded block 406. With a fixed UWB receiving slot to anchor mapping, such corruption is inevitable since UWB reception and LTE transmission are two independent events.

Figure 4B:
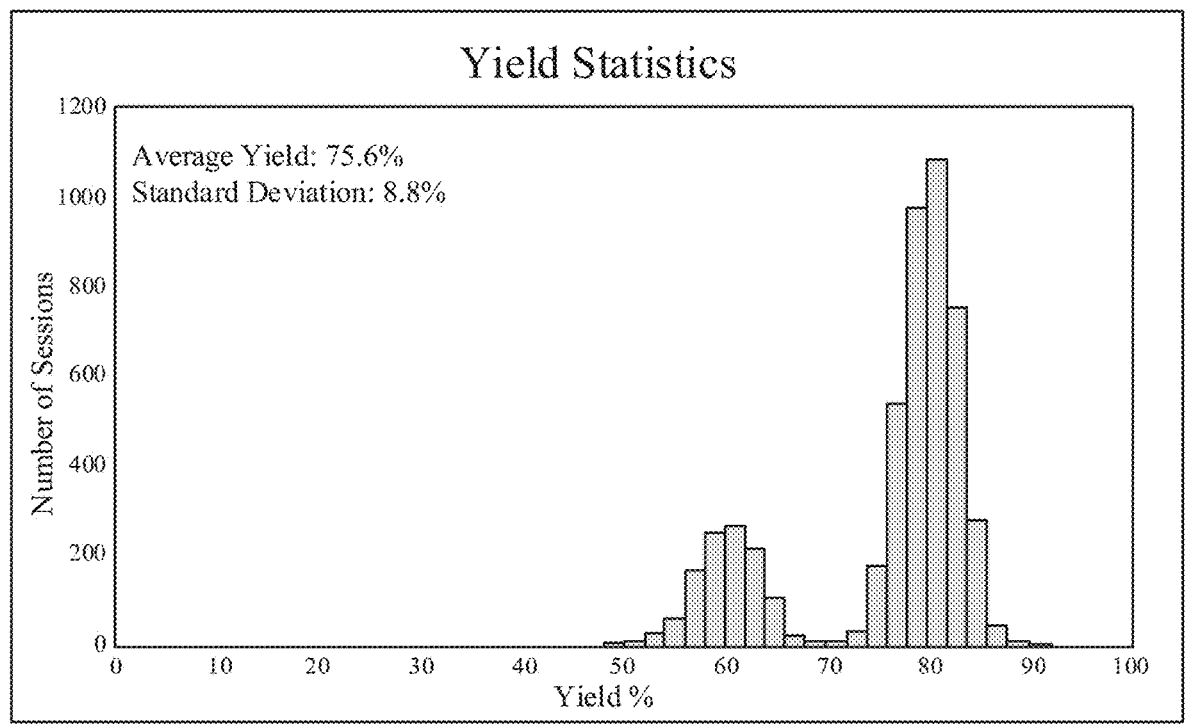
FIG. 4B illustrates a graph of yield statistics.

FIG. 4B shows a graph of yield loss statistics 450. In this example, statistics were gathered over 5000 UWB sessions with LTE transmission interference with a 20% duty cycle (e.g., LTE-TDD configuration 2). Even with a fairly low duty cycle, average yield was only around 75.6% with a standard deviation of 8.8%.

Figure 5A:
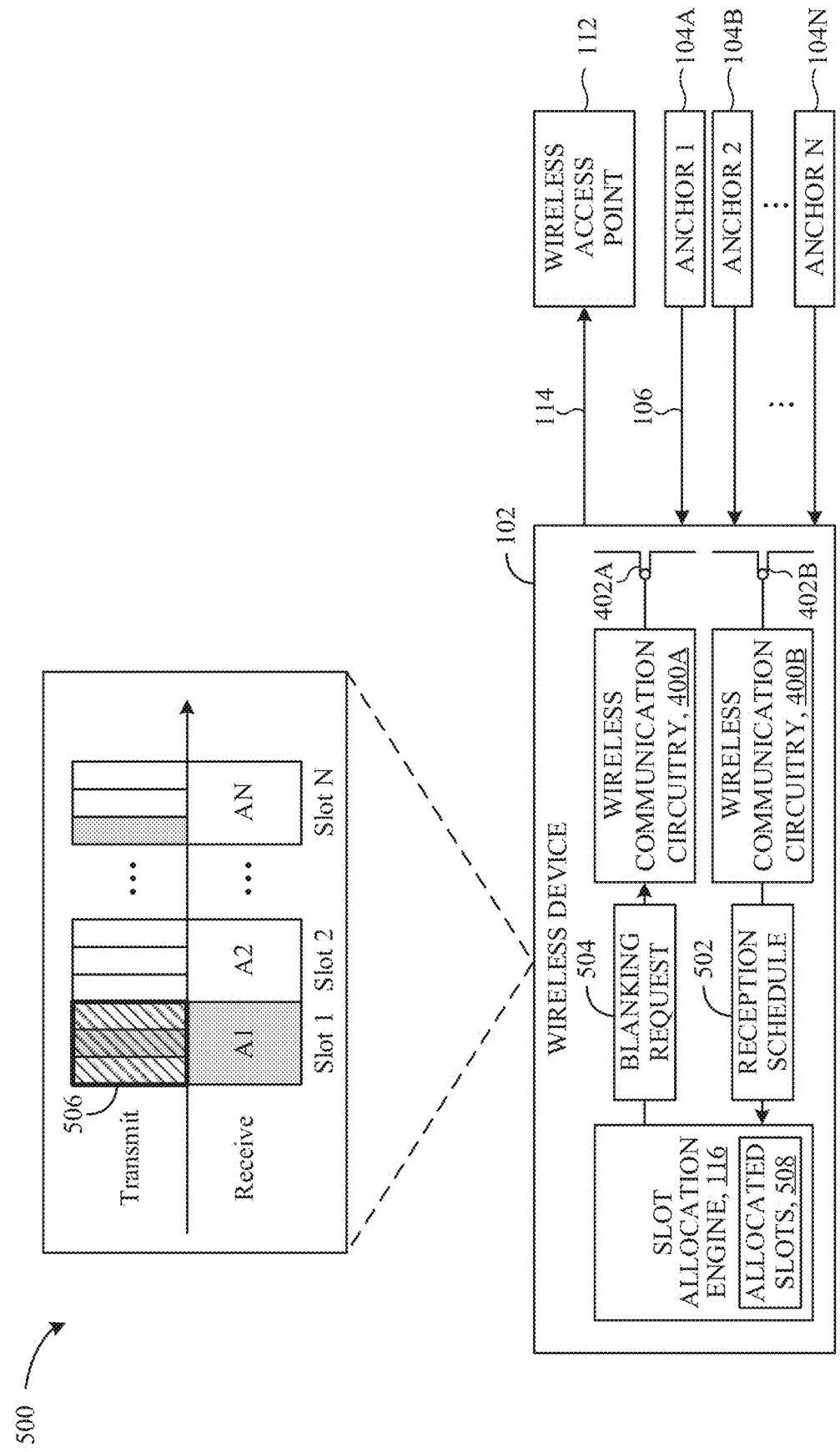
FIGS. 5A and 5B illustrate examples of dynamic slot allocation.

In order to reduce interference and the resulting data loss in coexisting wireless communication systems, the techniques described here provide for dynamic slot and anchor allocation. Referring to FIG. 5A, a system 500 for dynamic slot allocation in accordance with one aspect of the present disclosure is shown. In this example, when the wireless communication circuitry 400b anticipates the reception of UWB data, it sends an indication of the expected reception to the slot allocation engine 116. The indication can be sent in the form of a reception schedule 502 identifying the time slot(s) (e.g., slot 1) for which reception is expected, although other forms of indication can be used in some implementations (e.g., a number of slots for which reception is expected, a length of time for which reception is expected, etc.). In response, the slot allocation engine 116 generates a blanking request 504 to the wireless communications circuitry 400a requesting that the wireless communications circuitry temporarily blank its transmission. In this example, the slot allocation engine 116 has requested that the wireless communications circuitry 400a blank its transmissions during the time slot associated with UWB slot 1, as shown by the bolded black box 506 with hash marks.

Since the interfering LTE transmission has been blanked by operation of the blanking request, no further action is needed for successful reception of the UWB data in slot 1. In some examples, such as when the slot allocation engine 116 is unable to blank one or more of the slots needed for UWB reception (e.g., because only a portion of the transmission was blanked during part of the UWB reception period to minimize the impact to LTE), then the slot allocation engine 116 can generate data indicating the allocated slots 508. The allocated slots data 508 can be transmitted to the anchors 104 and/or the controller 108 for use in assigning the allocated slots to the appropriate anchors 104, as described below.

Figure 5B:
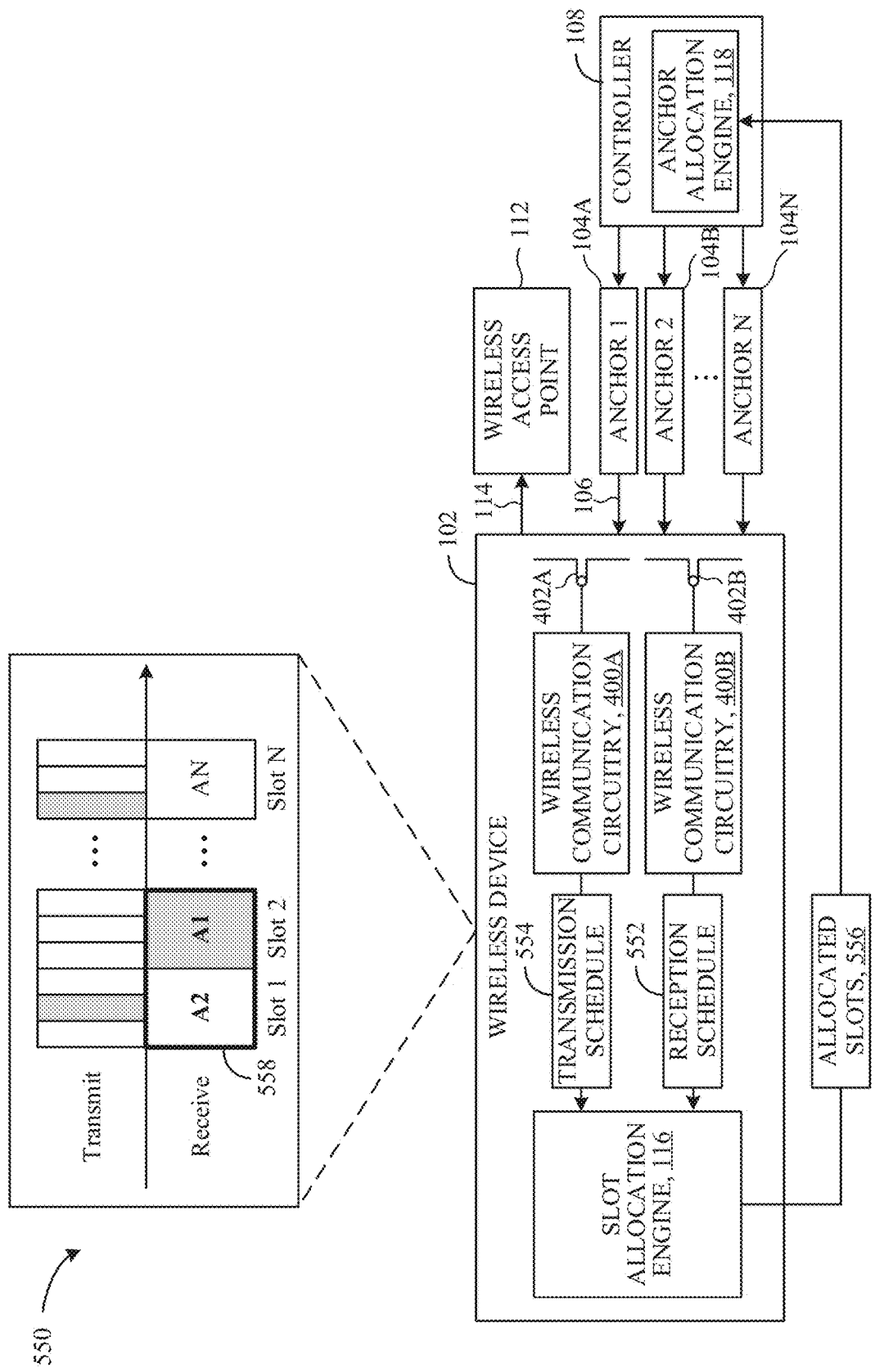

Referring to FIG. 5B, a system 550 for dynamic slot allocation in accordance with another aspect of the present disclosure is shown. In this example, no transmission blanking is needed. Instead, the slot allocation engine 116 receives a UWB reception schedule 552 (e.g., receiver timing, expected receptions, etc.) from the wireless communications circuitry 400b, and a LTE transmission schedule 554 (e.g., transmit timing, expected transmissions, etc.) from the wireless communications circuitry 400a. In practice, the LTE transmission schedule may only be known by the wireless device 102 shortly (e.g., a few milliseconds) before the transmissions occurs. As such, it may not be possible to rely on the full knowledge of the LTE transmission schedule to plan the slot allocation. However, information regarding a fixed or semi-fixed transmission pattern can be used for slot allocation in lieu of the full transmission schedule. For example, in LTE-TDD configuration 2, transmissions subframes occur once every 5 ms, and the slot allocation engine 116 can leverage this pattern for slot allocation.

Based on the UWB reception schedule 552 and the LTE transmissions schedule (whether it be a full transmission schedule or information indicative of a fixed or semi-fixed transmission schedule, such as an indication of the LTE-TDD configuration), the slot allocation engine 116 determines whether UWB reception slot(i) overlaps with a LTE transmission subframe. In some examples, the slot allocation engine 116 aligns the receive/transmit timings prior to doing the comparison. If the slot allocation engine 116 determines that UWB reception slot(i) overlaps with a LTE transmission subframe (and therefore would likely cause interference), it considers the next slot (e.g., slot(i+1)). On the other hand, if the slot allocation engine 116 determines that there is no overlap between UWB reception slot(i) and a LTE subframe, the slot allocation engine 116 allocates (e.g., reserves) the slot for the anchors 104. In this example, the slot allocation engine 116 has determined that slot 2 (currently allocated to anchor 2) is free of overlap, and thus allocates slot 2 for the anchors 104 (e.g., anchor 1, which is currently assigned to slot 1 but is expected to transmit UWB data to the wireless device 102 that will interfere with the LTE transmission occurring during slot 1).

After identifying the necessary time slots to accommodate the expected or scheduled UWB receptions (or running out of slots to consider), the slot allocation engine 116 generates data indicating the allocated slots 556. The slot allocation engine 116 transmits the allocated slots data 556 to the anchors 104 and/or the anchor allocation engine 118 of the controller 108, for example, over UWB using the wireless communication circuitry 400b and antenna(s) 402b or out of band using another wireless communication network, such as a Bluetooth or another transport. The anchor allocation engine 118 allocates (e.g., assigns) time slots to the anchors 104 based on the allocated slots data 556 and/or other data such as the position or trajectory of the wireless device 102, as described below. Since the anchors 104 have fixed slots for their entire software lifecycle, the anchor allocation engine 118 can, for example, reinitialize the software of the anchor 104 to allocate or assign it a new time slot. In this example, the anchor allocation engine 118 has allocated slot 2 to anchor 1 to allow for clear reception of the expected UWB data, as shown by the bolded box 558. The anchor allocation engine 118 has also allocated slot 1 to anchor 2 to prevent interference with the LTE transmission occurring during that time slot.

Figure 6A:
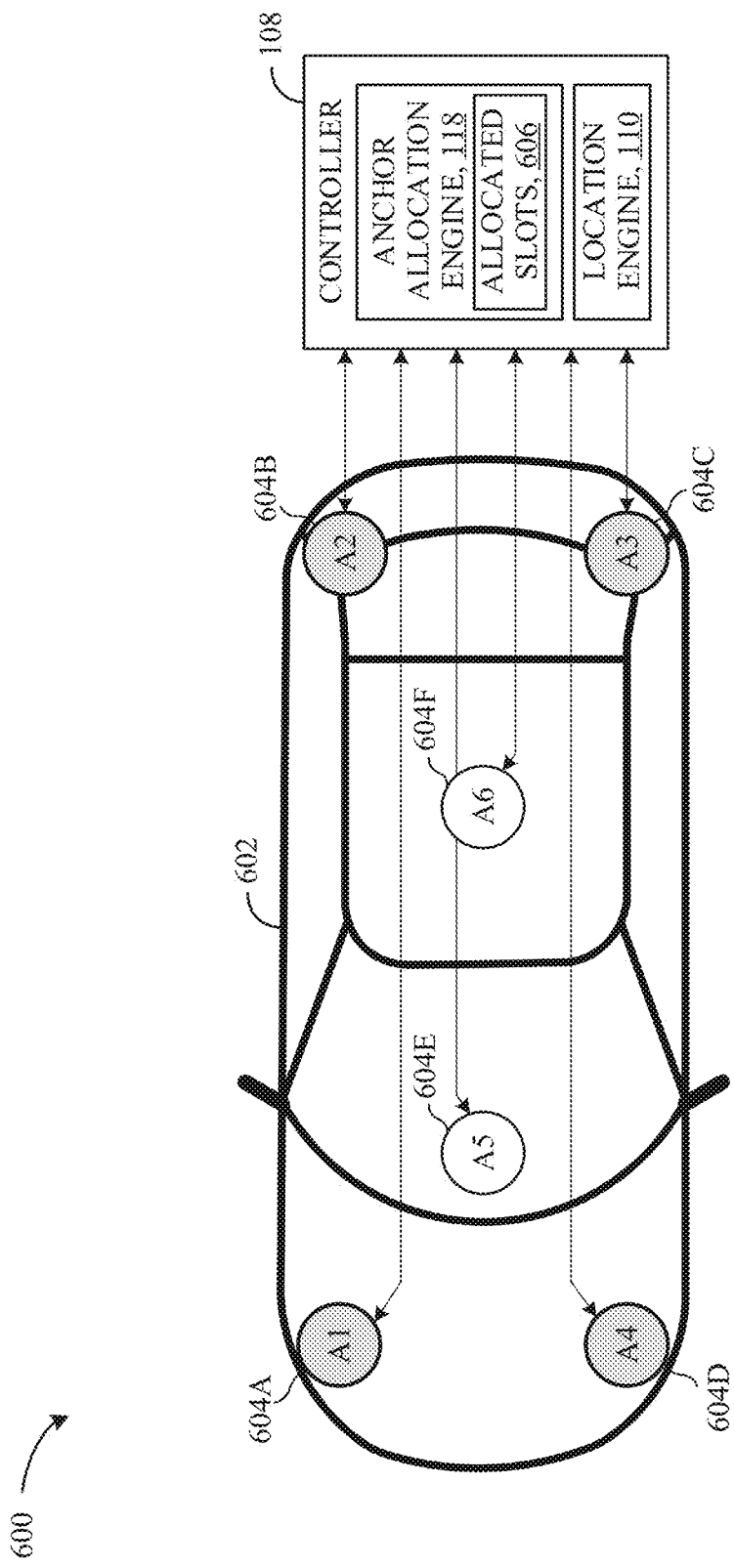
FIGS. 6A-6D illustrate examples of dynamic anchor allocation.

In some examples, the anchor allocation engine 118 can use the position or trajectory of the wireless device 102 alone or in combination with the allocated slot data to assign slots to the anchors 104. Referring to FIG. 6A, a system 600 for dynamic anchor allocation is shown in accordance with an aspect of the present disclosure. In this example, the system 600 includes anchors 604a, 604b, 604c, 604d, 604e, and 604f (referred to collectively as "anchors 604") affixed to a vehicle 602. In an example, the anchors 604 are the same as or similar to the anchors 104. Initially, when the controller 108 at the vehicle 602 has no prior knowledge of the position or trajectory of the wireless device 102, the anchor allocation engine 118 allocates the outside anchors 604a, 604b, 604c, 604d to the reserved slots identified in the allocated slots data 606 (as shown by the shaded fill). In this manner, the range for position detection and chance of detecting the wireless device 102 is maximized regardless of the device user's approach. In some examples, the anchor allocation engine 118 can deactivate or deallocate the inner anchors 606e and 606f until needed to reduce resource consumption.

Figure 6B:
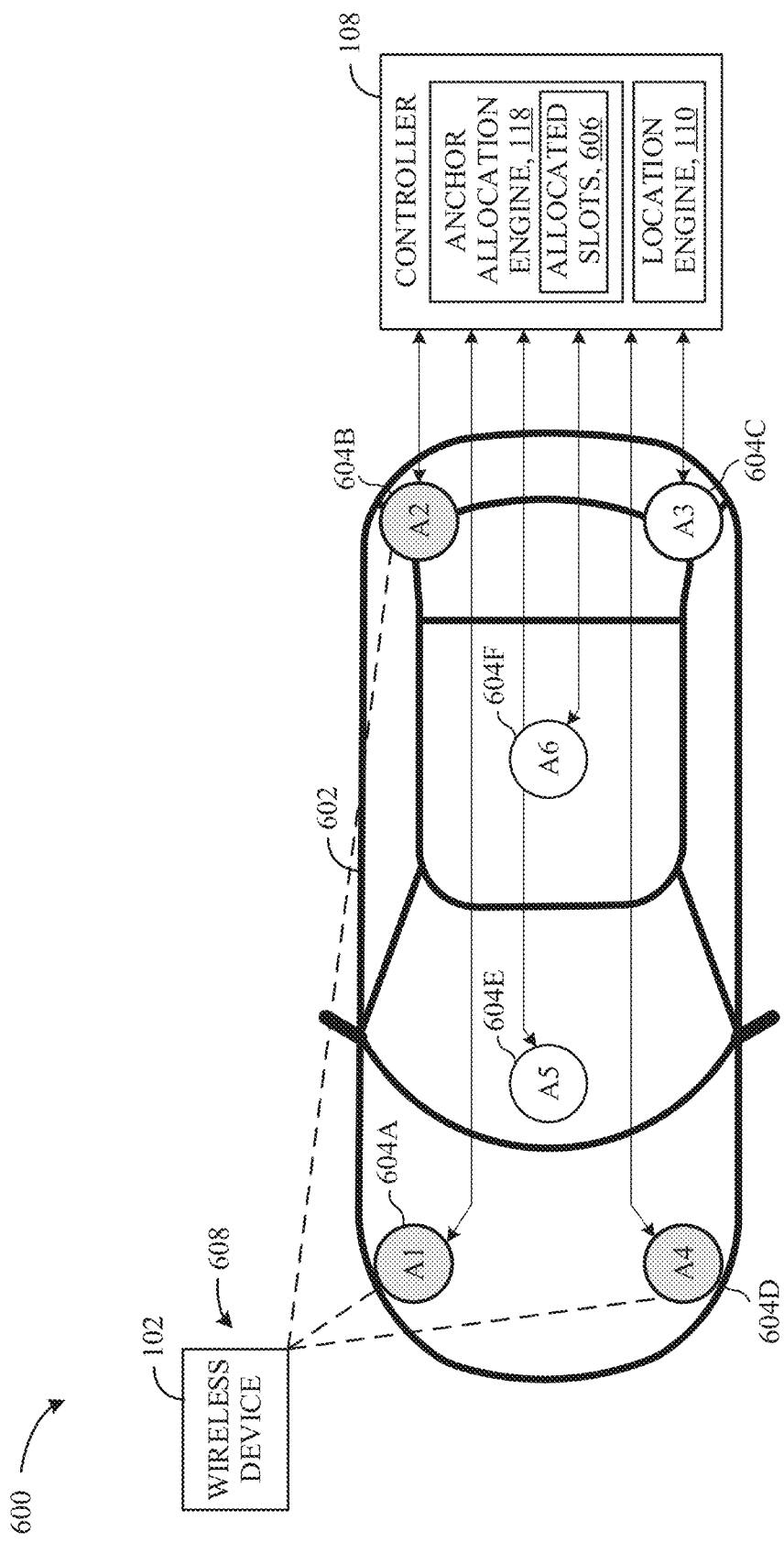

Referring to FIG. 6B, the system 600 has detected the wireless device 102 on approach and has performed ranging operations as described herein to determine the device's location 608. In this example, the anchor allocation engine 118 has determined that anchor 604c (anchor 3) is no longer necessary (e.g., no longer within suitable line-of-sight or communication range of the wireless device 102) based on the location 608 of the wireless device 102 in the front-right area of the vehicle 602. As such, the anchor allocation engine 118 can deactivate or deallocate anchor 604c to conserve resources.

Figure 6C:
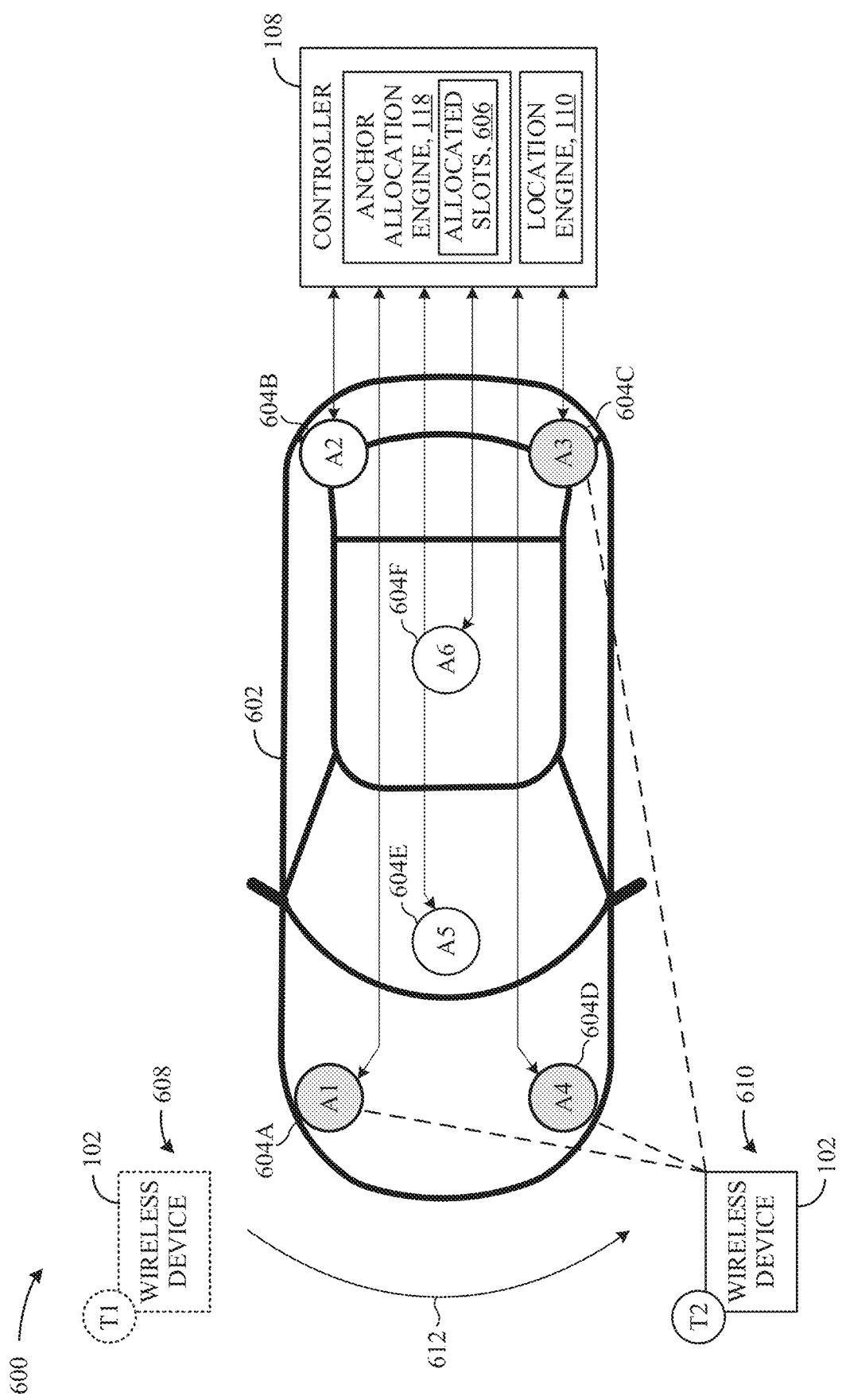

In FIG. 6C, the system 600 has detected that the wireless device 102 is moving from a first location 608 at time T1 (e.g., the location 608 in FIG. 6B) to a second location 610 at time T2 along a trajectory 612. In general, the system 600 can determine to switch the slot allocation for one or more of the anchors 604 based on the trajectory 612 (e.g., movement with direction) of the wireless device 102. For example, the system can use the currently prioritized anchors 604 (e.g., the anchors having allocated slots) to determine the trajectory that the wireless device 102 is taking and predict which of anchor(s) 604 the wireless device 102 will be in line-of-sight or communication range of in the immediate future (e.g., at time T2). This allows the system 600 to predict which of the anchor(s) 604 the wireless device 102 is approaching (e.g., will be coming into range of) and determine which anchor(s) to allocate slots to, thereby giving system 600 the best chance of maintaining continuous localization of the wireless device 102.

In this example, the anchor allocation engine 118 has determined that the previously allocated anchors 604a, 604c, 604d are the most appropriate anchors for ranging based on location 610 and the trajectory 612 of the wireless device 102. As such, the anchor allocation engine 118 maintains the allocation of these anchors (or reallocates if, for example, the allocated slots 606 have changed). In some examples, the controller 108 can unlock the vehicle's doors, start the vehicle's engine, operate a vehicle accessory, or combinations of them, among others, based on a determination that the location 610 or trajectory 612 of the wireless device 102 satisfies a threshold distance or approach vector to the vehicle 602.

Figure 6D:
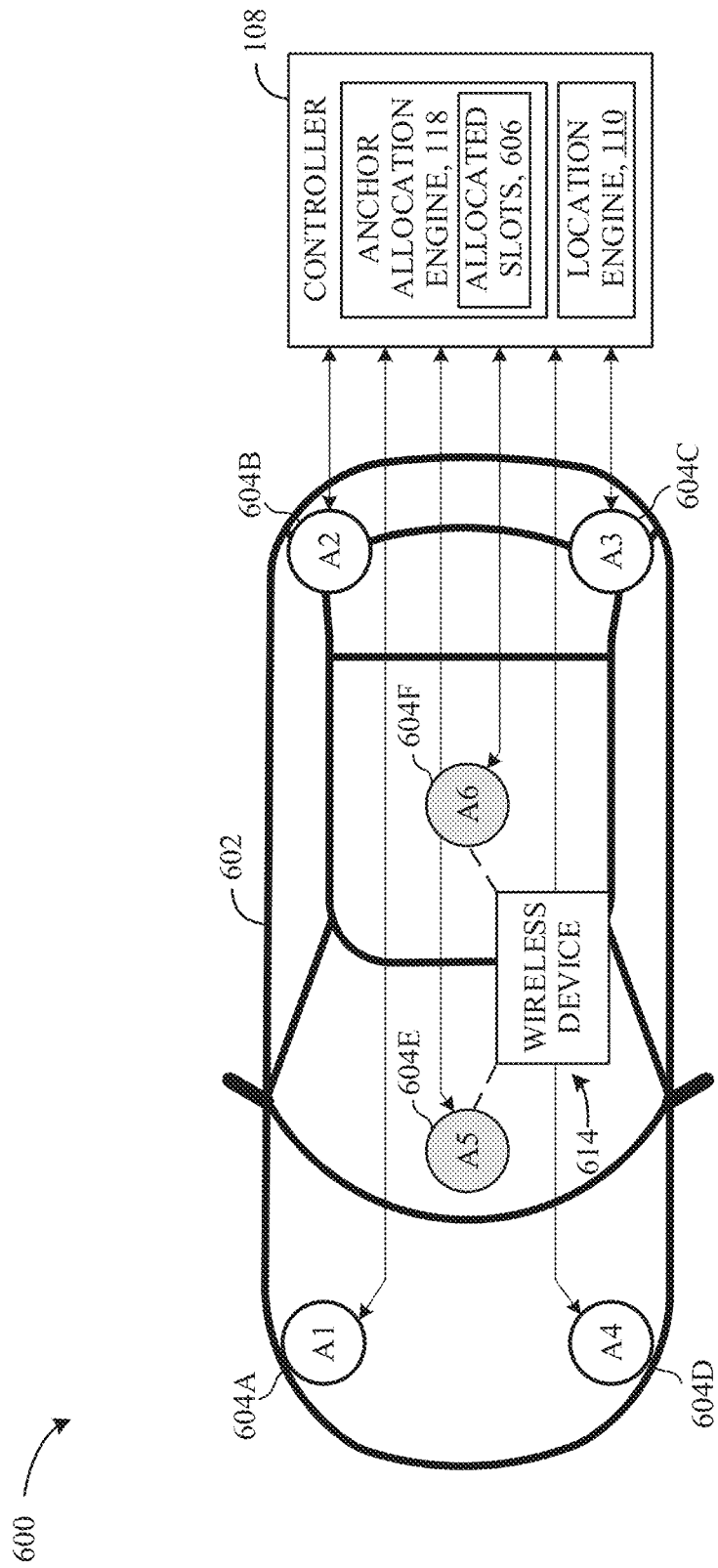

Referring to FIG. 6D, the system 600 has detected that the wireless device 102 is moving towards a location 614 within the vehicle 602. Based on this information, the anchor allocation engine 118 assigns time slots from the allocated slots data 606 to the inner anchors 604e and 606f to provide accurate ranging within the vehicle 602. In this example, the anchor allocation engine 118 also deactivates or deallocates the outer anchors 604a, 604c, and 604d. In some examples, the anchor allocation engine 118 can allocate the inner anchors 604e and 604f in response to a detection of interaction with the vehicle 608 (e.g., unlocking the vehicle, opening the door, starting the engine, etc.) alone or in combination with the location of the wireless device 102. In some examples, the controller 108 performs other operations (e.g., starting the vehicle's engine, operating a vehicle accessory, etc.) in response to a determination that the wireless device 102 is within the vehicle 602.

When the wireless device 102 exits the vehicle 602, the controller 108 and anchor allocation engine 118 can reverse the process for an approaching wireless device 102 described with reference to FIGS. 6A-6C (e.g., deallocate inner anchors 604, allocate anchors 604 based on location and/or trajectory of the wireless device 102, and allocate all outer anchors 604 when the location of the wireless device 102 can no longer be detected, such as by going out of range of the anchors 604). The controller 108 can also perform other operations (e.g., locking the vehicle's doors, closing the vehicle's windows, etc.) on exit.

Note that although the process of anchor allocation is described in the context of deployment within a vehicle 602, the techniques described here can be readily applied to other use cases without departing from the scope of the present disclosure.

Figure 7:
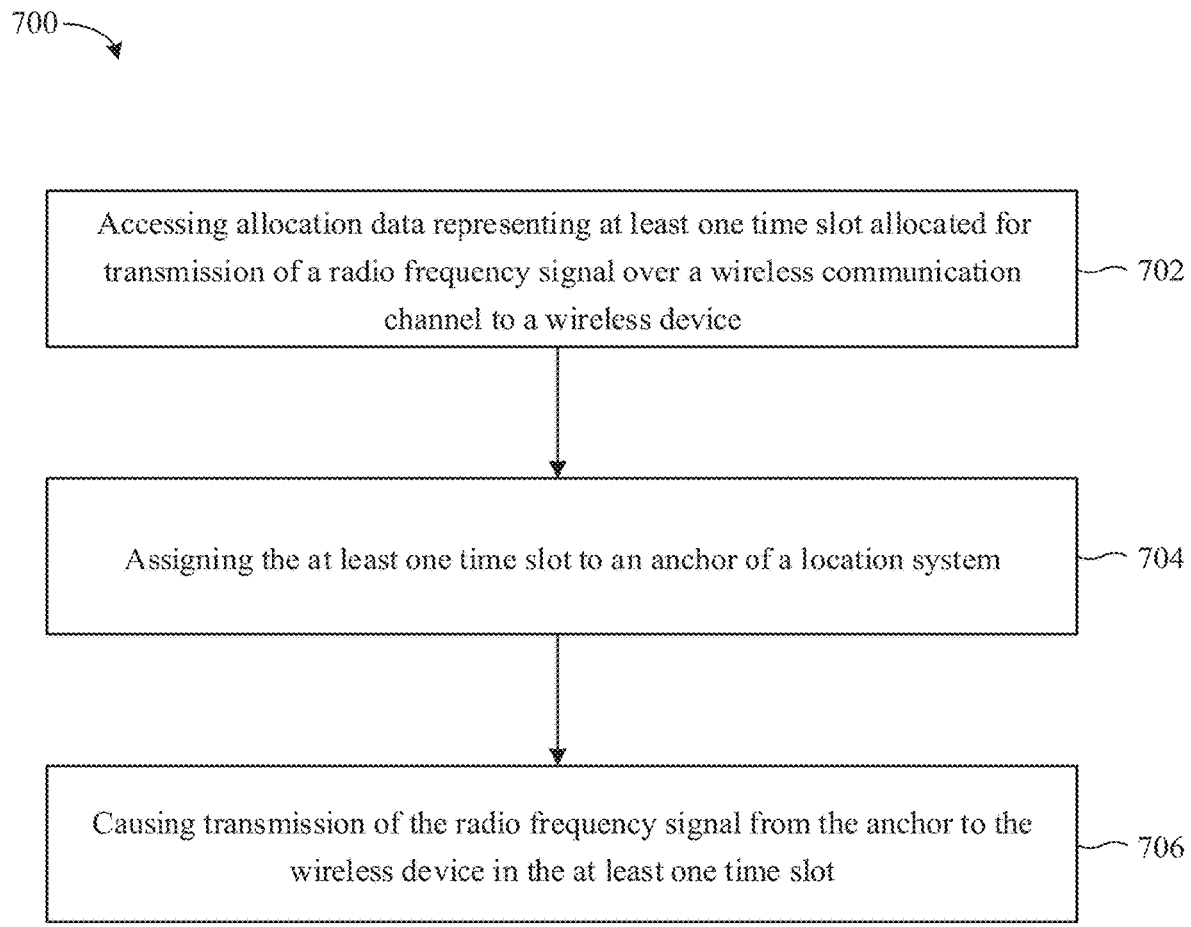
FIGS. 7 and 8 illustrate example processes for dynamic slot and anchor allocation.

FIG. 7 illustrates a flowchart of an example process 700 for dynamic slot and anchor allocation. In some examples, the electronic device(s), network(s), system(s), chip(s) or component(s), or portions or implementations thereof, of FIGS. 1-6 may be configured to perform the process 700.

Operations of the process 700 include accessing 702 allocation data representing at least one time slot allocated for transmission of a radio frequency signal over a wireless communication channel to a wireless device. In some examples, the radio frequency signal is an UWB signal, and the wireless communication channel is an UWB wireless communication channel (e.g., the wireless communication channel 106) between an anchor (e.g., an anchor 104, 604) and the wireless device (e.g., the wireless device 102). In some examples, the at least one time slot is allocated by a slot allocation engine 116 of the wireless device 102, and the allocation data is received at an anchor or a controller 108 of the anchor from the wireless device.

The at least one time slot is assigned 704 to an anchor of a location system. For example, an anchor allocation engine 118 included in the controller 108 can determine which anchor 104, 604 to assign the at least one time slot to based on a location and/or trajectory of the wireless device relative to the anchor (or based on a determination that the location of the wireless device is unknown). The anchor allocation engine 118 can then assign the at least one time slot to the identified anchor (e.g., by initializing the anchor with the allocated time slot).

In some examples, the anchor that is assigned the at least one time slot is a first anchor, and the operations include receiving a location of the wireless device and assigning the at least one time slot to a second anchor of the location system that is different from the first anchor based on the location of the wireless device. The second anchor can be located closer to the location of the wireless device than the first anchor. In some examples, the anchor that is assigned the at least one time slot is a first anchor, and the operations include: receiving data representing a trajectory (e.g., the trajectory 612) of the wireless device, identifying a second anchor of the location system based on the trajectory of the wireless device, and assigning the at least one time slot to the second anchor. Identifying the second anchor can include determining, based on the trajectory of the wireless device, that the wireless devices is approaching a range of the second anchor (and, optionally, leaving a range of the first anchor). In some examples, the anchor that is assigned the at least one time slot is a first anchor, and the operations include receiving data indicating that the wireless device has entered a particular location (e.g., a vehicle), and assigning the at least one time slot to a second anchor of the location system that is within the particular location (e.g., within the vehicle, such as within a cabin of the vehicle).

Operations of the process 700 further include causing 706 transmission of the radio frequency signal from the anchor to the wireless device in the at least one time slot. For example, once the anchor has been assigned the at least one time slot as described herein, the controller 108 (or the anchor 105, 604 itself) can cause transmission of the radio frequency signal to the wireless device 102 in the assigned time slot.

Figure 8:
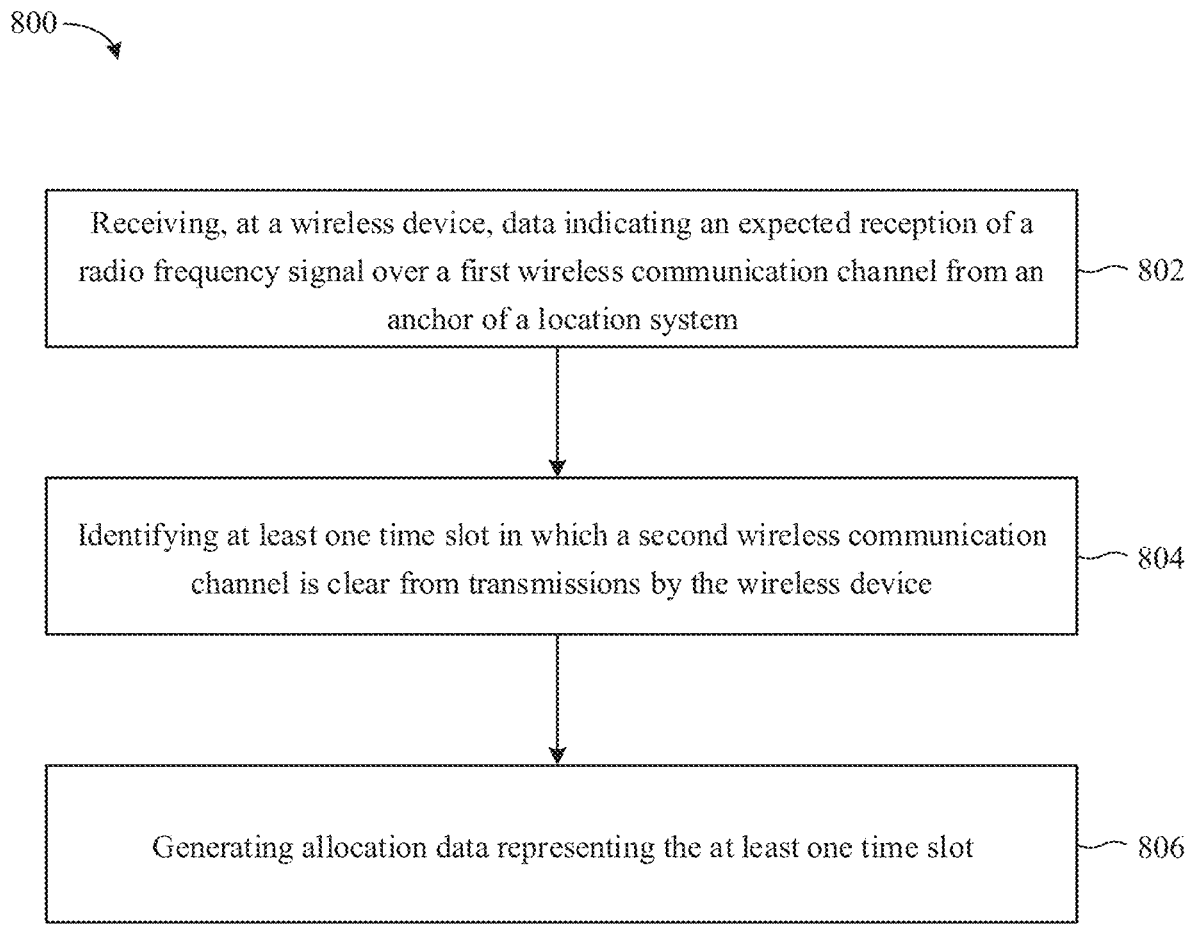

FIG. 8 illustrates a flowchart of an example process 800 for dynamic slot and anchor allocation. In some examples, the electronic device(s), network(s), system(s), chip(s) or component(s), or portions or implementations thereof, of FIGS. 1-6 may be configured to perform the process 800.

Operations of the process 800 include receiving 802, at a wireless device, data indicating an expected reception of a radio frequency signal over a first wireless communication channel from an anchor of a location system. In some examples, the radio frequency signal is an UWB signal, and the first wireless communication channel is an UWB wireless communication channel (e.g., the wireless communication channel 106) between an anchor (e.g., an anchor 104, 604) and the wireless device (e.g., the wireless device 102). In some examples, the expected reception of the radio frequency signal over the first wireless communication channel is triggered by a ranging operation between the wireless device and the anchor of the location system.

At least one time slot in which a second wireless communication channel is clear from transmissions by the wireless device is identified 804. In some examples, the second wireless communication channel (e.g., the wireless communication channel 114) is a radio frequency channel for cellular communications (e.g., LTE communications) between the wireless device 102 and a wireless access point 112, such as a cellular base station. In some examples, the at least one time slot (which can be different from a time slot of the expected reception of the radio frequency signal) is identified by a slot allocation engine 116 of the wireless device 102.

In some examples, the at least one time slot is identified based on a transmission blanking request used to prevent transmission on the second wireless communication channel by the wireless device during the at least one time slot. For example, the slot allocation engine 116 can cause transmission of a transmission blanking request to wireless communication circuitry 400a of the wireless device 102 to prevent transmission of signals (e.g., LTE signals) over the second wireless communication channel 114 during a particular time period, and can allocate the at least one time slot within the particular time period.

In some examples, the operations include: accessing data representing a transmission pattern for transmissions by the wireless device on the second wireless communication channel, determining, based at least in part on the transmission pattern, whether the at least one time slot overlaps with a transmission on the second wireless communication channel, and identifying the at least one time slot in response to a determination that the at least one slot does not overlap with a transmission on the second wireless communication channel. In some examples, the transmission pattern is (or is derived from) a Long-Term Evolution time-division duplex (LTE-TDD) configuration, such as LTE-TDD configuration 2.

Operations of the process 800 further include generating 806 allocation data representing the at least one time slot. In some examples, the allocation data is transmitted to the anchor of the location system (e.g., directly or through the controller 108). In some examples, the allocation data is transmitted to the anchor of the location system over a third wireless communication channel (e.g., a Bluetooth channel or other transport) that is different than the first and second wireless communication channels. The radio frequency signal is then received at the wireless device from the anchor in the at least one time slot.

In some examples, at least a portion of a transmission by the wireless device on the second wireless communication channel interferes with reception of the radio frequency signal over the first wireless communication channel. For example, a harmonic of the transmission by the wireless device on the second wireless communication can interfere with reception by the wireless device on the first wireless channel (or vice versa). In some examples, at least a portion of a frequency band of the first wireless communication channel overlaps with a frequency band of the second wireless communication channel.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. In an example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "computing device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as standalone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

While this specification includes many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

What is claimed is:

1. A method, comprising:
    accessing allocation data for a wireless device, the allocation data representing at least one time slot allocated for reception of a radio frequency signal by the wireless device over a wireless communication channel;
    receiving data representing a trajectory of the wireless device;
    identifying an anchor of a location system based on the data representing the trajectory of the wireless device;
    assigning the at least one time slot to the anchor of the location system; and
    causing transmission of the radio frequency signal from the anchor to the wireless device in the at least one time slot.

2. The method of claim 1, wherein the anchor is a first anchor, the method comprising:
    receiving a location of the wireless device; and
    assigning the at least one time slot to a second anchor of the location system that is different from the first anchor based on the location of the wireless device.

3. The method of claim 2, wherein the second anchor is located closer to the location of the wireless device than the first anchor.

4. The method of claim 1, wherein identifying the anchor includes determining, based on the trajectory of the wireless device, that the wireless devices is approaching a range of the anchor.

5. The method of claim 1, wherein the anchor is a first anchor, the method comprising:
    receiving data indicating that the wireless device has entered a vehicle; and
    assigning the at least one time slot to a second anchor of the location system that is within the vehicle.

6. The method of claim 1, comprising receiving the allocation data from the wireless device.

7. The method of claim 1, wherein the radio frequency signal comprises an ultra-wideband (UWB) signal.

8. A device, comprising:
    one or more processors; and
    one or more computer-readable storage medium storing instructions which, when executed by the one or more processors, cause the one or more processors to:
        access allocation data for a wireless device, the allocation data representing at least one time slot allocated for reception of a radio frequency signal by the wireless device over a wireless communication channel;
        receive data representing a trajectory of the wireless device;
        identify an anchor of a location system based on the data representing the trajectory of the wireless device;

assign the at least one time slot to the anchor of the location system; and cause transmission of the radio frequency signal from the anchor to the wireless device in the at least one time slot.

9. The device of claim 8, wherein the anchor is a first anchor, the one or more computer-readable storage medium storing instructions which, when executed by the one or more processors, cause the one or more processors to:

receive a location of the wireless device; and assign the at least one time slot to a second anchor of the location system that is different from the first anchor based on the location of the wireless device.

10. The device of claim 9, wherein the second anchor is located closer to the location of the wireless device than the first anchor.

11. The device of claim 8, wherein identifying the anchor includes determining, based on the trajectory of the wireless device, that the wireless device is approaching a range of the anchor.

12. The device of claim 8, wherein the anchor is a first anchor, the one or more computer-readable storage medium storing instructions which, when executed by the one or more processors, cause the one or more processors to:

receive data indicating that the wireless device has entered a vehicle; and assign the at least one time slot to a second anchor of the location system that is within the vehicle.

13. The device of claim 8, wherein the radio frequency signal comprises an ultra-wideband (UWB) signal.

14. A non-transitory computer-readable medium storing instructions which, when executed by one or more processors, cause the one or more processors to:

access allocation data for a wireless device, the allocation data representing at least one time slot allocated for reception of a radio frequency signal by the wireless device over a wireless communication channel;

receive data indicating that the wireless device has entered a vehicle;

assign the at least one time slot to an anchor of a location system, wherein the anchor of the location system is within the vehicle; and cause transmission of the radio frequency signal from the anchor to the wireless device in the at least one time slot.

15. The non-transitory computer-readable medium of claim 14, wherein the anchor is a first anchor, the non-transitory computer-readable medium storing instructions which, when executed by the one or more processors, cause the one or more processors to:

receive a location of the wireless device; and assign the at least one time slot to a second anchor of the location system that is different from the first anchor based on the location of the wireless device, wherein the second anchor is located closer to the location of the wireless device than the first anchor.

16. The non-transitory computer-readable medium of claim 14, wherein the anchor is a first anchor, non-transitory computer-readable medium storing instructions which, when executed by the one or more processors, cause the one or more processors to:

receive data representing a trajectory of the wireless device;

identify a second anchor of the location system based on the trajectory of the wireless device; and assigning the at least one time slot to the second anchor.

17. The non-transitory computer-readable medium of claim 16, wherein identifying the second anchor includes determining, based on the trajectory of the wireless device, that the wireless devices is approaching a range of the second anchor.

* * * * *